United States Patent
Heilig et al.

[11] Patent Number: 5,895,069
[45] Date of Patent: Apr. 20, 1999

[54] KNEE RESTRAINT MEANS

[75] Inventors: Alexander Heilig, Wissgoldingen; Dante Bigi, Mutlangen, both of Germany

[73] Assignee: TRW Occupant Restraint Systems GmbH, Alfdorf, Germany

[21] Appl. No.: 08/873,216

[22] Filed: Jun. 11, 1997

[30] Foreign Application Priority Data

Jul. 26, 1996 [DE] Germany ........................ 296 13 045 U

[51] Int. Cl.$^6$ ............................................. B60R 21/22
[52] U.S. Cl. ........................ 280/730.1; 280/753; 280/752; 280/732
[58] Field of Search ........................ 280/753, 751, 280/730.1, 752, 728.1, 728.3, 732

[56] References Cited

U.S. PATENT DOCUMENTS

| | | | |
|---|---|---|---|
| 3,910,595 | 10/1975 | Katter et al. | 280/732 |
| 3,951,427 | 4/1976 | Wilfert | 280/732 |
| 5,458,366 | 10/1995 | Hock et al. | 280/729 |
| 5,536,043 | 7/1996 | Lang et al. | 280/753 |
| 5,544,913 | 8/1996 | Yamanishi et al. | 280/730.2 |
| 5,653,465 | 8/1997 | Ferrero | 280/753 |
| 5,797,620 | 8/1998 | Eyrainer | 280/730.1 |

FOREIGN PATENT DOCUMENTS

| | | | |
|---|---|---|---|
| 2153601 | 5/1972 | Germany . | |
| 2063478 | 7/1972 | Germany . | |
| 2510725 | 9/1976 | Germany | 280/751 |
| 2-249740 | 3/1989 | Japan | 280/730.2 |
| 9-109813 | 4/1997 | Japan . | |
| 97/09207 | 3/1997 | WIPO . | |

OTHER PUBLICATIONS

2244 Research Disclosure, (1995) Jun., No. 374, Emsworth, GB, p. 371, entitled Inflatable Bellows–Box Panel.

*Primary Examiner*—Christopher P. Ellis
*Attorney, Agent, or Firm*—Tarolli, Sundheim, Covell, Tummino & Szabo

[57] ABSTRACT

A knee restraint means for occupants of a vehicle with a footwell for the feet of the occupant includes a gas bag in the footwell, a gas generator, a knee cushion on which the occupant impacts in case of an accident, and an inflatable gas bag cover with an outer surface and of energy-absorbent material. The gas bag cover is deformed in a crash situation by inflation of the gas bag in the direction of the footwell. The gas bag cover forms the knee cushion together with the inflated gas bag.

12 Claims, 6 Drawing Sheets

KNEE RESTRAINT MEANS

The invention relates to a vehicle occupant knee restraint means, including a gas bag in the footwell of a vehicle, a gas generator and a gas bag cover of energy-absorbent material.

BACKGROUND OF THE INVENTION

A generic knee restraint means is known from U.S. Pat. No. 3,784,223. By means of a knee restraint means a non-buckled up vehicle occupant is prevented from diving forwards in the direction of the footwell in a crash situation. In the case of the known knee restraint means, the gas bag is disposed below the steering column behind a gas bag cover which comprises a break line. In a crash situation, the deploying gas bag breaks through the cover and is deployed towards the knees of the occupant to cushion the movement of the knees. As regards the position of the destructed gas bag cover, it must always be assured that an occupant in a crash situation cannot bounce against it and becoming injured thereby.

Furthermore, a knee restraint means is known from U.S. Pat. No. 5,312,131, the gas bag cover of which is configured as a hingable lid, here too it being necessary to assure that the vehicle occupant cannot be injured by the lid in a crash situation.

In addition, known deformable elements incorporated in the region of the knee room to cushion the knees of an occupant in a crash situation offer only inadequate protection and restrict the knee room due to their thickness as required technically.

In the case of knee restraint means known hitherto, there is also the risk for occupants situated outside of the center seated position that their knees side-slip the knee restraint means and are not restrained.

BRIEF DESCRIPTION OF THE INVENTION

The invention defines a knee restraint means for vehicle occupants which excels by requiring little necessary incorporating space and providing good restraint result. Moreover, it also offers vehicle occupants sufficient protection when they are situated outside of the center seated position. The knee restraint means according to the invention for occupants of a vehicle with a footwell for the feet of said occupant includes a gas bag in said footwell, a gas generator, a knee cushion on which the occupant impacts in case of an accident, and an inflatable gas bag cover with an outer surface and of energy-absorbent material. The gas bag cover is deformed in a crash situation by inflation of the gas bag in the direction of the footwell. The gas bag cover forms the knee cushion together with the inflated gas bag. On deployment, the gas bag neither penetrates the cover nor does it hinge it open as is the case in knee restraint means known to date, it instead deforms it in the direction of the knees of the occupant so that the latter bounces against a soft knee cushion in a crash situation. The knee restraint means according to the invention is a lightweight, compact structure comprising few components.

The hardness of the gas bag and thus of the knee cushion as a whole can be adjusted by various means, for example, by providing discharge openings in the gas bag and by means of a multistage gas generator.

Preferably, the gas bag cover is deformed by the gas bag at the outer surface of the cover only by approximately 10 to 100 mm in the direction of the footwell with respect to its initial condition, as a result of which side-slipping of the knees of occupants located outside of the center seated position is prevented.

DETAILED DESCRIPTION OF PREFERRED EMBODIMENTS

Figure 1:
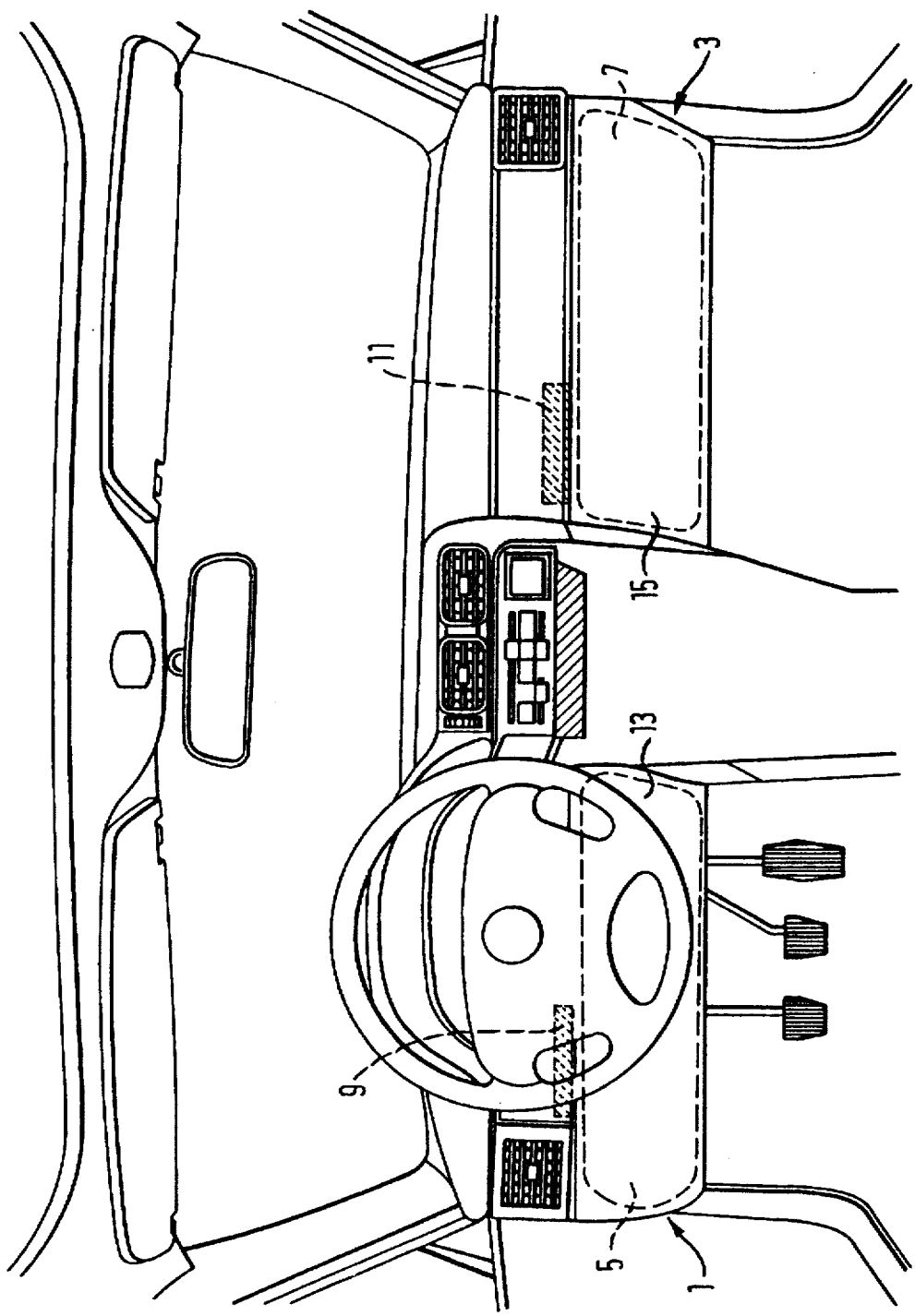
FIG. 1 shows in the forward direction a vehicle interior in the region of the dashboard with a knee restraint means according to the invention each for the driver's and front passenger's side.

FIG. 1 shows, arranged in the footwell of the vehicle, a knee restraint means 1 for the driver's side and a knee restraint means 3 for the front passenger's side.

Figure 4:
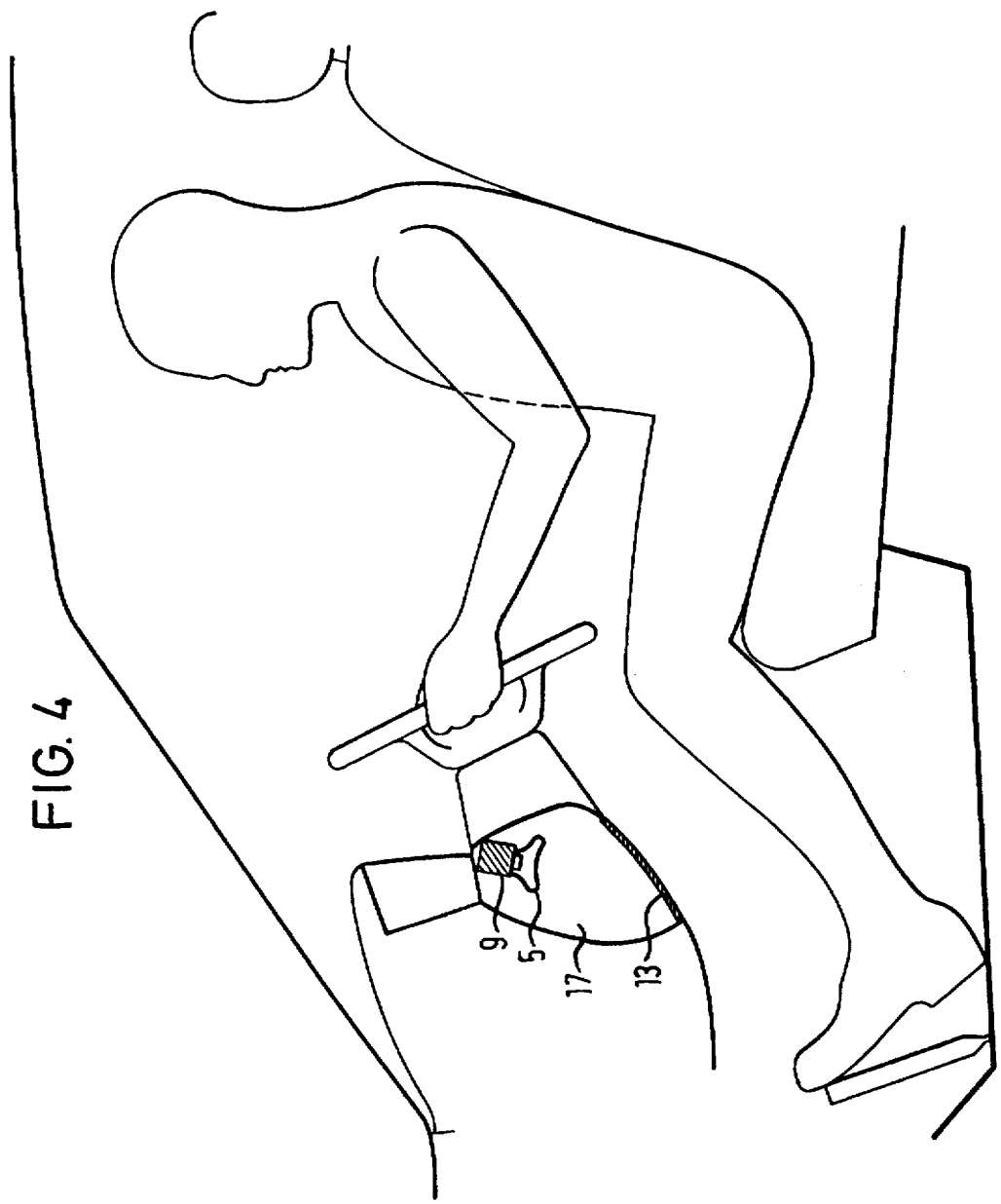
FIG. 4 is a schematic section view of the knee restraint means shown in FIG. 1 on the driver's side with the gas bag non-inflated.

Each individual knee restraint means 1, 3 comprises in turn a gas bag 5, 7, the gas bags 5, 7 being illustrated by the broken lines in FIG. 1 in the inflated condition. Each gas bag 5, 7 is assigned a gas generator 9, 11 arranged concealed in the upper region of the dashboard. Each of the knee restraint means 1, 3 further comprises a gas bag cover 13, 15 which covers the gas bags 5, 7 in the inflated condition and in the non-inflated condition. The gas bag covers 13, 15 are made of a soft, energy-absorbent material deformable by the gas bag 5, 7. The thickness of the gas bag covers 13, 15 and the material thereof are adapted to the volume of the assigned gas bags 5, 7 and to their hardness in the inflated condition so that they are deformed during inflation of the gas bags 5, 7 in the direction of the knees of the vehicle occupants, this being even more evident from the FIGS. 4 and 5. In FIG. 4 the gas bag 5 is shown in the condition still to be deployed. A cavity 17 provided in the dashboard behind the cover 13 is taken up by the gas bag 5, but not completely. The cavity 17 is illustrated oversize in FIG. 4.

In a crash situation pyrotechnical material contained in the gas generator 9 is primed and a stored gas volume liberated which flows through several discharge openings 19 in its housing into the interior of the gas bag 5, inflating it. At the end of inflation, the gas bag 5 abuts against the inner side of the gas bag cover 13 finally and, as evident from FIG. 5, deforming it in the direction of the knees of the occupant. The gas bag cover 13 neither bursts nor hinges out of the way, it forming together with the gas bag 5 in contact therewith a knee cushion against which the knees of the vehicle occupant impact, preventing the vehicle occupant from diving into the knee room. The knees moving in the direction of the footwell in a crash situation receive early restraint so that they impact the knee restraint means 1 at a low relative velocity. The outer side of the gas bag cover 13 is deformed in the inflated condition of the gas bag 5 only by an increment a of approx. 10 to 100 mm with respect to its occupant so as to cause no injuries due to a gas bag cover 13, 15 being inflated over a large increment α or due to a large-volume gas bag. Whilst in the case of the embodiment shown in FIG. 5 the gas bag cover 13 is deformed by expansion of almost all of its external surface, it is just as possible (cf. FIG. 6) to provide a gas bag cover which is deformable only in the edge region. By providing a corresponding structure the remaining region is dimensionally stable and acts like a plate moved in the direction of the footwell. This plate distributes the load introduced by knee impact over a large surface area.

The knee restraint means 1, 3 effectively stabilize the position of the vehicle occupant. The knee cushions formed by the knee restraint means 1, 3 absorb the kinetic energy of the knees upon impact therewith and dampen the impact. Occupants located outside of the center seated position are unable to side-slip the knee restraint means 1, 3 since the latter do not comprise the usual, large-volume gas bags emerging from a cover with a shape which is adapted to a center seated position, but instead extend over a broad surface area transversely over the full footwell. The knees coming into contact with the gas bag covers 13, 15 are not fixed in all directions, since they come up against the knee cushion and do not dive into large-volume gas bags to be held therein, like a ball joint, which results in higher stressing of the thigh bones in the axial direction. In the case of the knee cushion the knees still have freedom of movement in the vertical and horizontal direction.

The hardness of each knee cushion is dictated by the hardness of the associated gas bag 5, 7 when inflated and by the materials of the deformable cushion. This in turn is influenced by the gas bags 5, 7 consisting of a fabric, the permeability characteristic of which changes as a function of the gas bag internal pressure. To reduce the hardness of the gas bags 5, 7 they additionally feature discharge openings.

Moreover, only a few of many discharge openings 19 in the gas generator housing may be opened partly or fully by a suitable signal-actuatable means so that as a result of this, too, the gas bag internal pressure is controllable.

The gas generator 9, 11 are, furthermore, configured as multistage gas generator so that the gas bag internal pressure can be varied by priming one of more stages.

Figure 2:
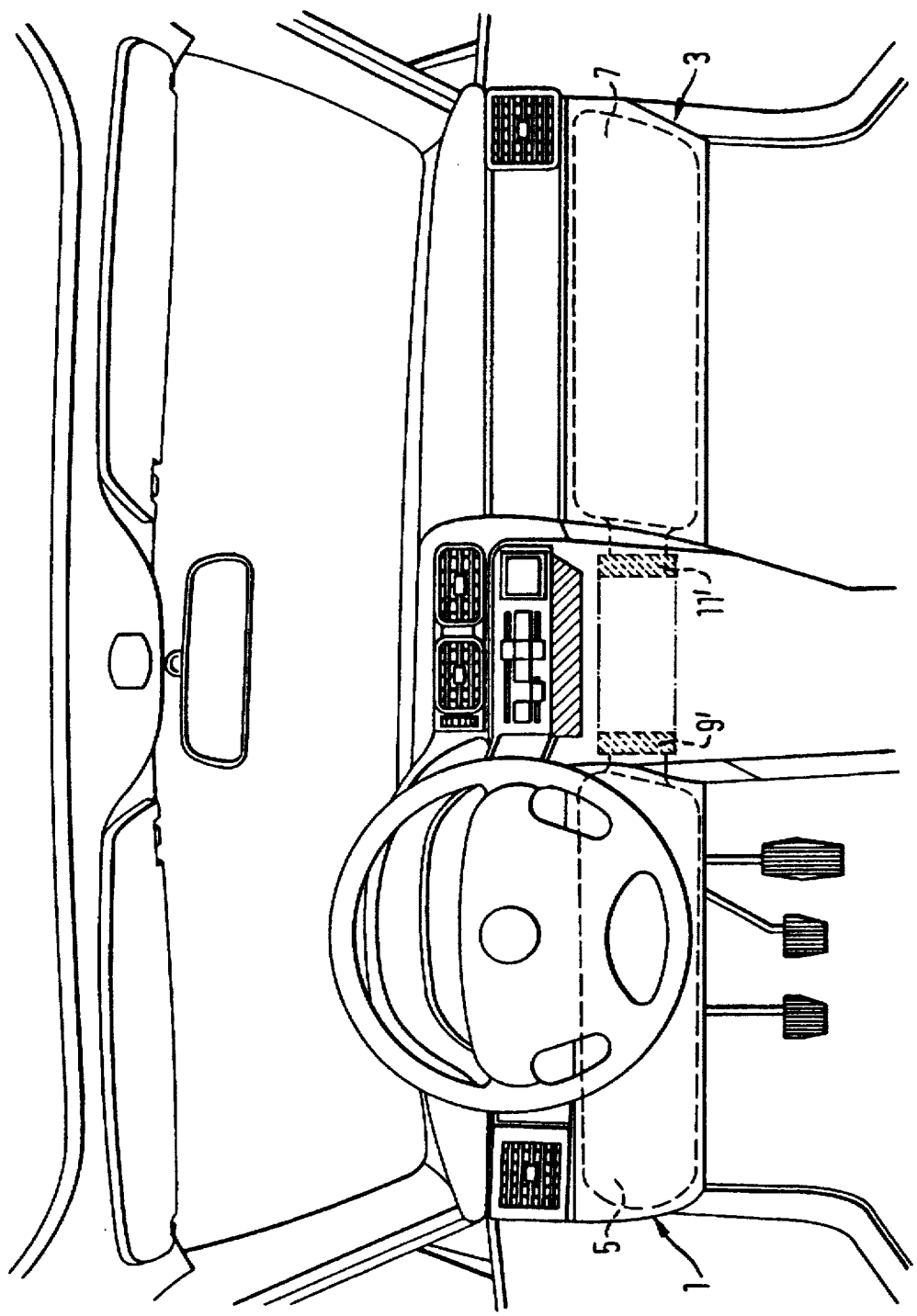
FIG. 2 is a corresponding view of a second embodiment of knee restraint means including gas generator disposed in the center console.
Figure 5:
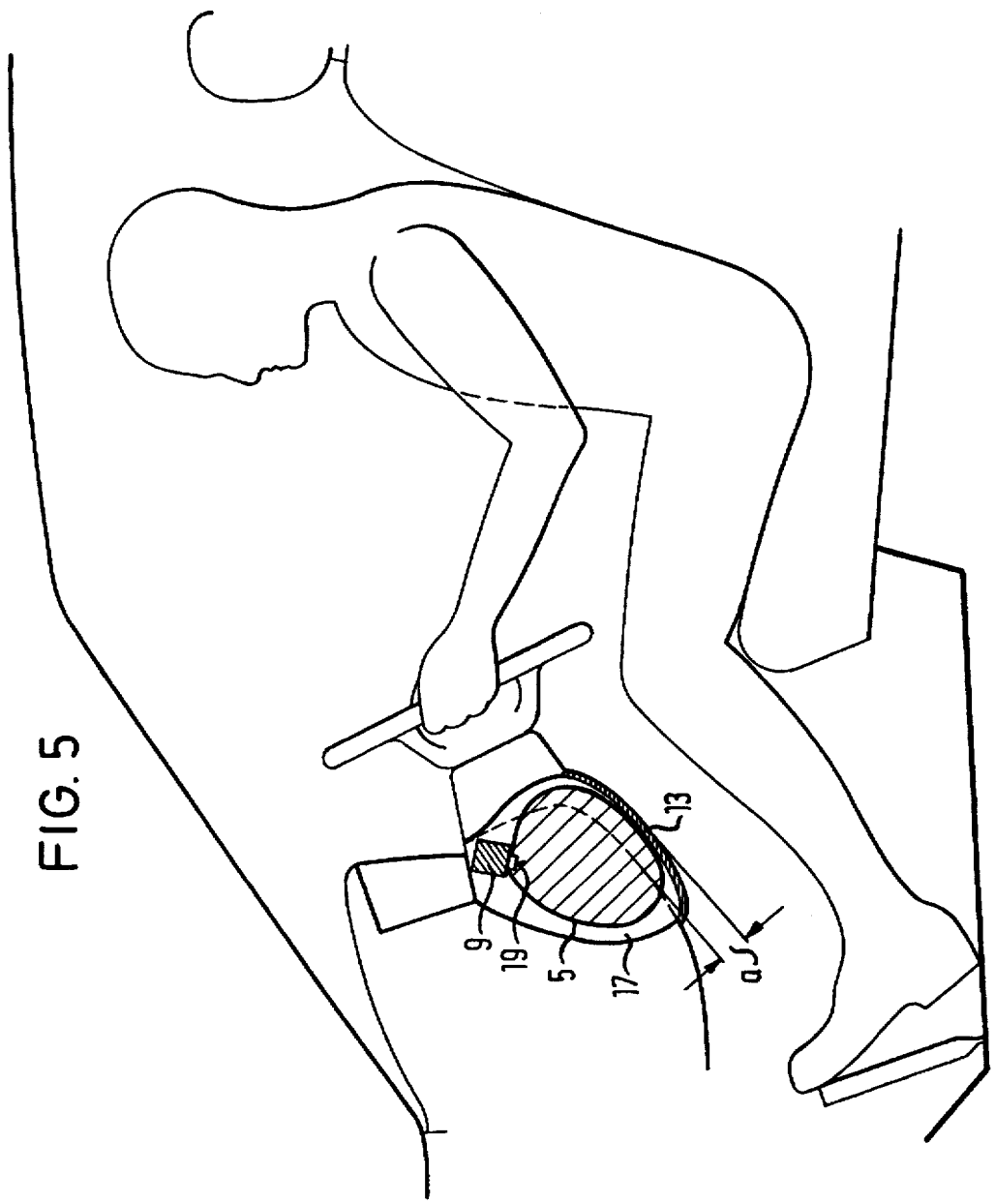
FIG. 5 shows the knee restraint means of FIG. 4 with the gas bag deployed and the gas bag cover deformed.
Figure 6:
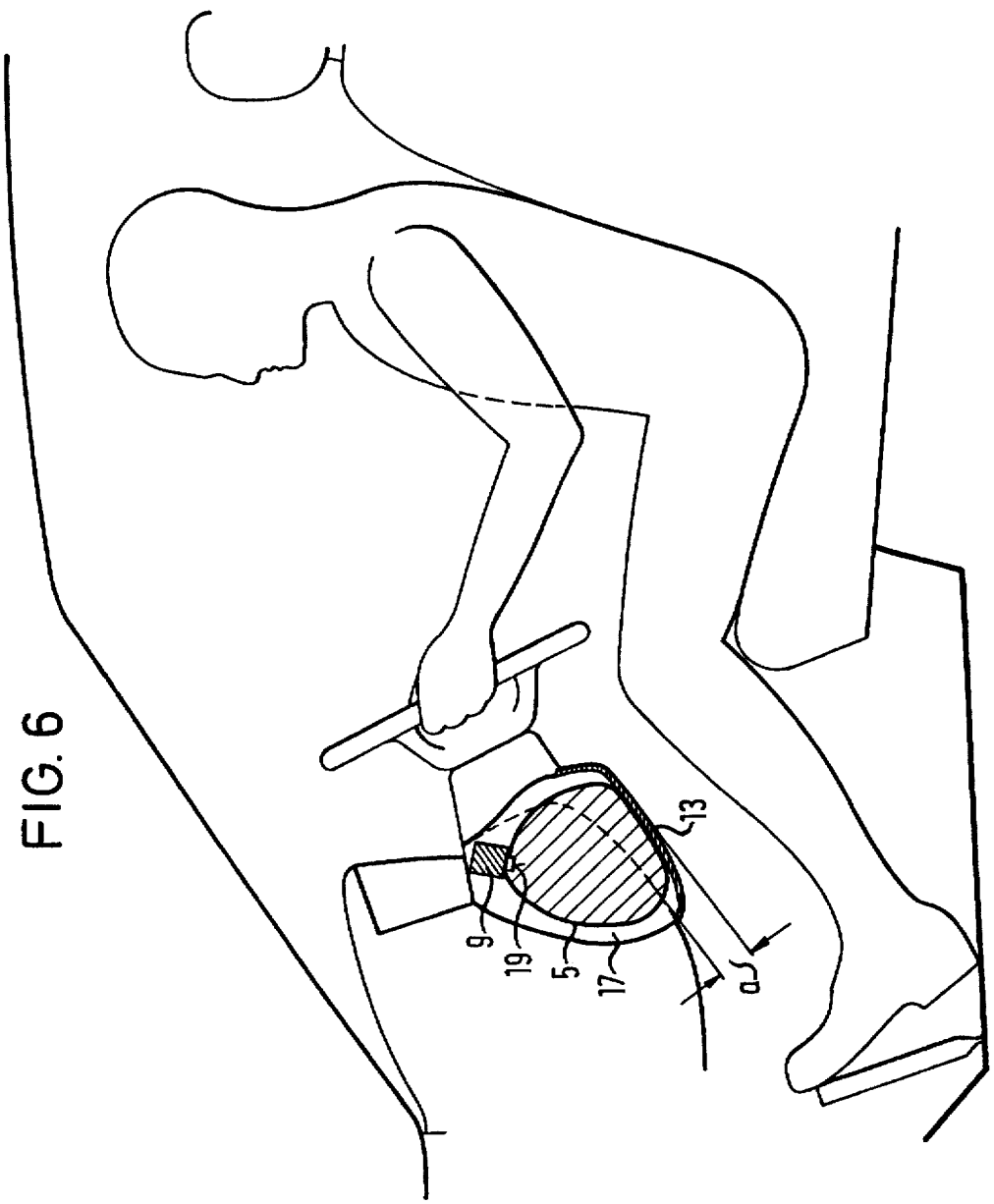
FIG. 6 is a view corresponding to that of FIG. 5 of a further embodiment of the knee restraint means according to the invention.

Whilst the gas generator 9, 11 in the embodiment of the knee restraint means 1, 3 shown in FIGS. 1, 4 and 5 are disposed just below the instrument panel in the upper region of the dashboard, so that the knees are in no way able to come up against the housings of the gas generator 9, 11, the corresponding gas generator 9', 11' as shown in FIG. 2 are integrated in the center console. The gas generator 9', 11' may also be grouped together into a common gas generator as is indicated dot-dashed in FIG. 2, the knee restraint means 1, 3 then forming a common knee restraint means. Although this involves a saving in costs, the gas bag assigned to the front passenger seat is always also inflated in a crash situation even when the front passenger seat is not occupied.

Figure 3:
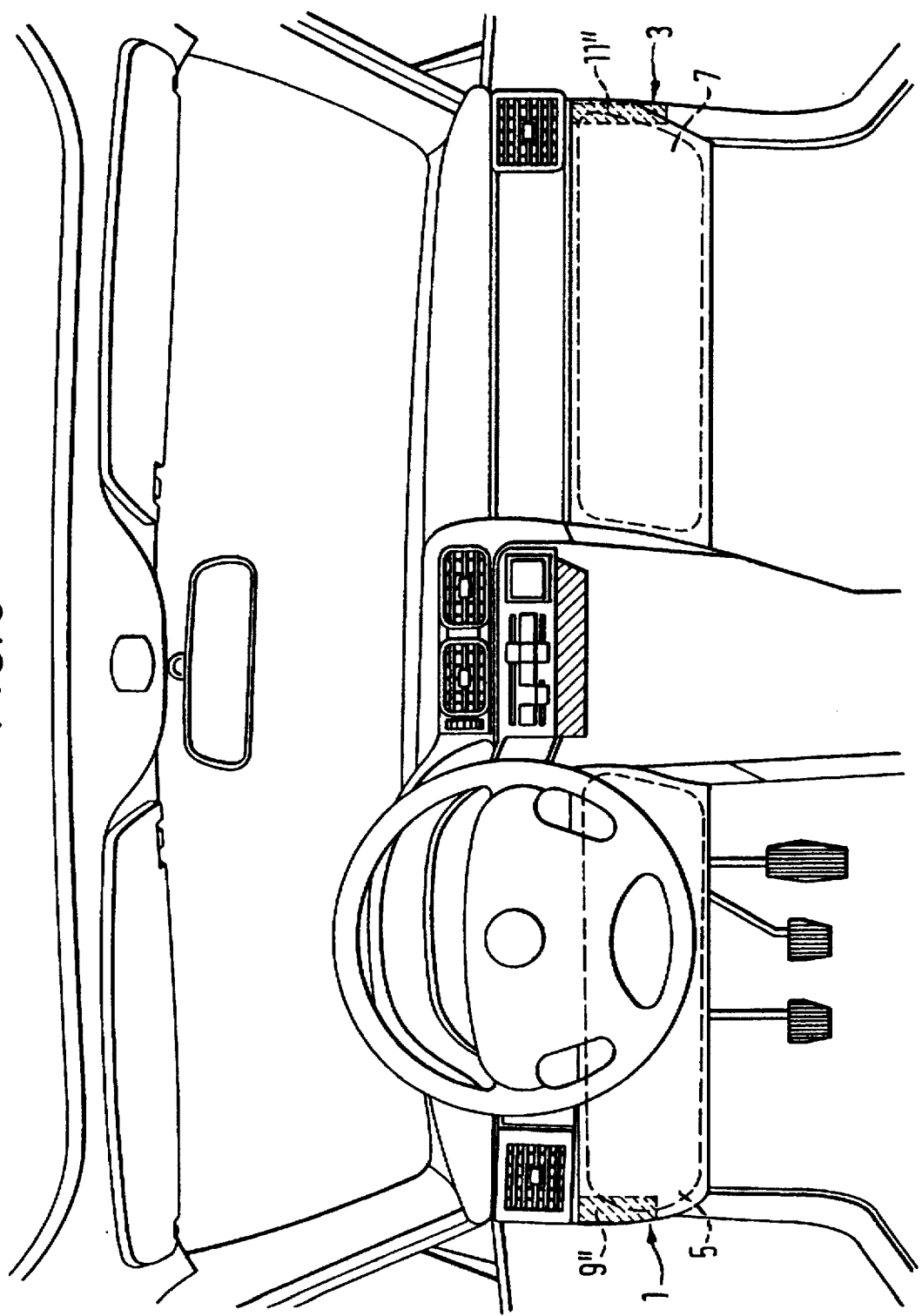
FIG. 3 is a corresponding view of a third embodiment of knee restraint means including gas generator disposed in the A pillar.

In the embodiment of the knee restraint means 1, 3 shown in FIG. 3 the gas generator 9", 11" are disposed on the side in the region of the A pillar of the vehicle.

We claim:

1. A knee restraint means for occupants of a vehicle with a dashboard and a footwell for the feet of said occupant, said knee restraint means including a gas bag in a cavity provided in said dashboard, a gas generator, a knee cushion on which said occupant impacts in case of an accident, and a gas bag cover with an outer surface made of energy-absorbent material, said gas bag cover being deformed in a crash situation by inflation of said gas bag in the direction of said footwell, said gas bag cover forming said knee cushion together with said inflated gas bag.

2. The knee restraint means as set forth in claim 1, wherein said gas bag consists of a fabric, the permeability characteristic of which changes as a function of the gas bag internal pressure.

3. The knee restraint means as set forth in claim 1, wherein said gas bag is provided with discharge openings.

4. The knee restraint means as set forth in claim 1, wherein a multistage gas generator is provided.

5. The knee restraint means as set forth in claim 1, wherein said gas generator has a housing, said housing being provided with at least one discharge opening having a cross-section which is variable.

6. The knee restraint means as set forth in claim 1, wherein said gas bag cover has an original condition defined by said non-inflated gas bag and a deformed condition defined by said inflated gas bag and wherein said gas bag cover is deformed by said inflated gas bag at said outer surface with respect to its original condition by between 10 and 100 mm in the direction of said footwell of said vehicle.

7. The knee restraint means as set forth in claim 1, wherein said footwell is limited between a center console, an A-pillar and a dashboard of said vehicle and wherein said gas generator is disposed in the region of one of said center console, said A-pillar and in the upper region of said dashboard.

8. The knee restraint means as set forth in claim 1, wherein said gas bag cover is deformed over almost its total outer surface.

9. The knee restraint means as set forth in claim 1, wherein said gas bag cover has an edge region and is deformed only in said edge region and is dimensionally stable in the remaining region.

10. A knee restraint means for the driver's side and the front passenger's side of a vehicle, including one knee restraint means as set forth in claim 1 each for the driver's side and the front passenger's side, each comprising a gas bag, and including a common gas generator for both gas bags.

11. A knee restraint means for occupants of a vehicle with a dashboard and a footwell for the feet of said occupant, said knee restraint means including a gas bag in a cavity provided in said dashboard, a gas generator, a knee cushion on which said occupant impacts in case of an accident, and a one-piece gas bag cover with an outer surface made of energy-absorbent material, said gas bag cover being deformed in a crash situation by inflation of said gas bag in the direction of said footwell, said gas bag cover forming said knee cushion together with said inflated gas bag.

12. A knee restraint for an occupant of a vehicle with a dashboard and a footwell for the feet of the occupant, said knee restraint comprising:

an inflatable gas bag in a cavity in the dashboard;

a gas generator for inflating said gas bag;

an energy-absorbent gas bag cover, said gas bag cover having an outer surface engageable by the occupant during a collision and an inner surface engageable with said gas bag upon inflation of said gas bag, said gas bag cover being deformed by said gas bag upon inflation of said gas bag in a direction toward the footwell.

* * * * *